United States Patent [19]

Bartow et al.

[11] Patent Number: 5,412,803

[45] Date of Patent: May 2, 1995

[54] COMMUNICATIONS SYSTEM HAVING PLURALITY OF ORIGINATOR AND CORRESPONDING RECIPIENT BUFFERS WITH EACH BUFFER HAVING THREE DIFFERENT LOGICAL AREAS FOR TRANSMITTING MESSAGES IN SINGLE TRANSFER

[75] Inventors: Neil G. Bartow, Saugerties; Paul J. Brown, Poughkeepsie; Robert S. Capowski, Verbank; Louis T. Fasano, Poughkeepsie; Thomas A. Gregg, Highland; Gregory Salyer, Woodstock; Douglas W. Westcott, Rhinebeck, all of N.Y.

[73] Assignee: International Business Machines Corporation, Armonk, N.Y.

[21] Appl. No.: 839,652

[22] Filed: Feb. 20, 1992

[51] Int. Cl.⁶ .............................................. G06F 13/00
[52] U.S. Cl. ............................. 395/575; 395/200; 395/250; 371/16.3; 364/238.6; 364/284.1; 364/940.81; 364/DIG. 1
[58] Field of Search ............... 395/250, 275, 200, 575, 395/425, 325; 364/238.6, 940.81, 239, 284.1, 240.9; 371/16.3, 25.1, 32, 33, 34, 35, 62; 370/32

[56] References Cited

U.S. PATENT DOCUMENTS

| | | | |
|---|---|---|---|
| 4,777,595 | 10/1988 | Strecker et al. | 364/200 |
| 4,807,118 | 2/1989 | Lin et al. | 364/200 |
| 4,930,093 | 5/1990 | Houser et al. | 395/550 |
| 4,947,317 | 8/1990 | DiGiulio et al. | 364/200 |
| 5,019,964 | 5/1991 | Yamamoto et al. | 364/200 |
| 5,077,655 | 12/1991 | Jinzaki | 395/200 |
| 5,146,564 | 9/1992 | Evans et al. | 395/250 |
| 5,167,035 | 11/1992 | Mann et al. | 395/575 |
| 5,175,730 | 12/1992 | Murai | 370/85.2 |
| 5,222,219 | 6/1993 | Stumpf et al. | 395/325 |
| 5,247,163 | 9/1993 | Ohno et al. | 371/16.3 |
| 5,261,051 | 11/1993 | Masden et al. | 395/200 |
| 5,261,060 | 11/1993 | Free | 395/325 |
| 5,263,151 | 11/1993 | Ikeno | 371/62 |
| 5,297,143 | 3/1994 | Fridrich et al. | 370/85.3 |

OTHER PUBLICATIONS

Mischa Schwartz, "Telecommunication Networks", 1987, pp. 372–384.

Primary Examiner—Thomas C. Lee
Assistant Examiner—Moustafa M. Meky
Attorney, Agent, or Firm—Lawrence D. Cutter; Sean M. McGinn

[57] ABSTRACT

Buffers are provided in two elements between which data is to be transferred wherein both buffers are managed solely by the originator of the data transfer. Only one transfer is required to transmit a message, and a second transfer acknowledges the completion of the function because message delivery to the receiver is guaranteed under the implemented protocol. When a request is sent, a message timer is started at the sender. When the normal response for the request is received, the timer is reset; however, if the duration of the message operation exceeds the timeout value, a message-timeout procedure is initiated. When the cancel command is issued, a second timer is set. If this timer is exceeded, subsequent cancel commands can be issued. If subsequent cancel commands are issued, a cancel complete command must be sent and responded to. Since the commands must be executed in the sequence in which they are received, a response to the cancel complete command ensures that there are no other cancel operation commands remaining in the receiver, allowing subsequent operations to start without danger of being canceled.

22 Claims, 10 Drawing Sheets

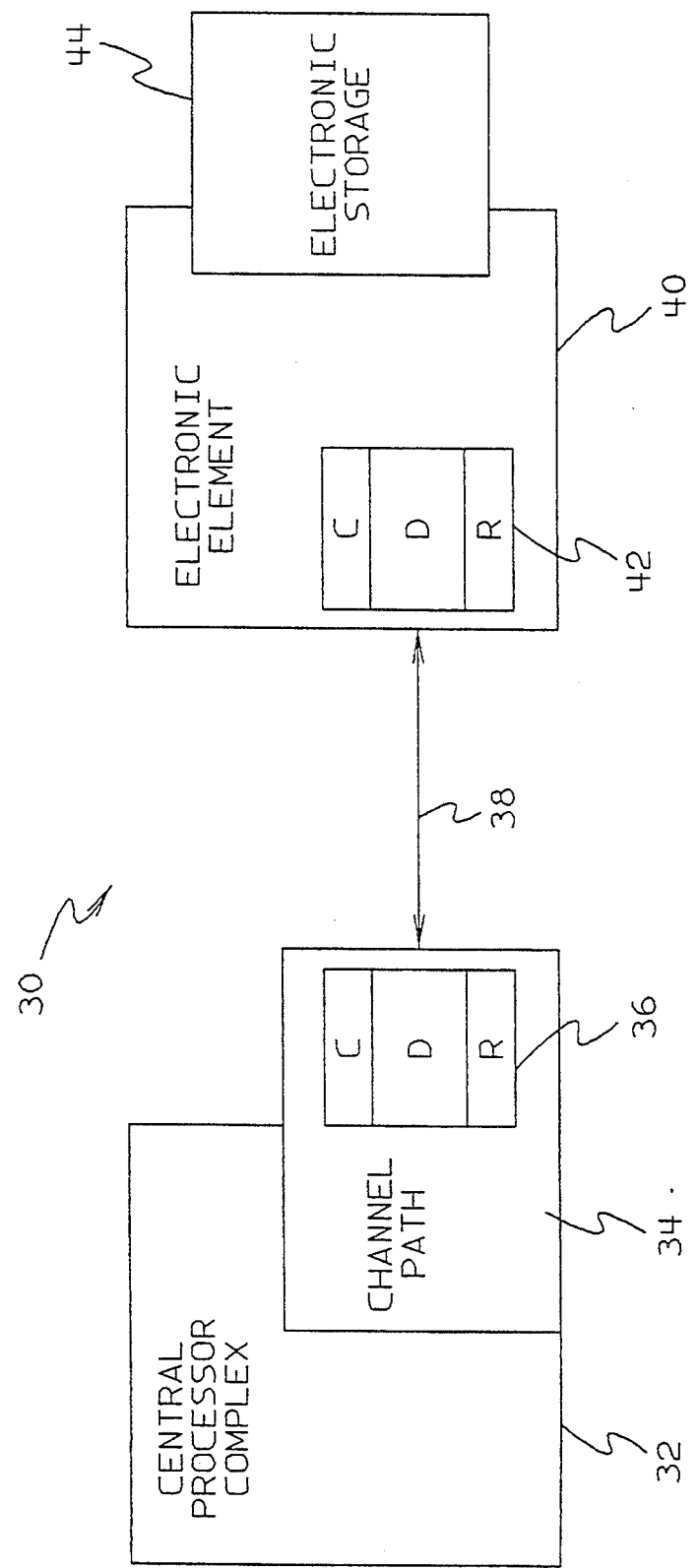

COMMUNICATIONS SYSTEM HAVING PLURALITY OF ORIGINATOR AND CORRESPONDING RECIPIENT BUFFERS WITH EACH BUFFER HAVING THREE DIFFERENT LOGICAL AREAS FOR TRANSMITTING MESSAGES IN SINGLE TRANSFER

BACKGROUND OF THE INVENTION

1. Field of the Invention

The present invention generally relates to channels for exchanging messages between central processing complexes and message processors, including input-/output (I/O) devices and systems and other central processing complexes, and more particularly to high performance buffering which facilitates very low latency communications between elements of very high speed data processing systems. The invention allows true peer-to-peer communications between central processing complexes and implements a recovery procedure of individual operations in a multiple operation environment.

2. Description of the Prior Art

In a conventional data processing system, a central processing complex (CPC) having a channel path is connected to a control unit to which are attached one or more strings of direct access storage devices (DASDs), such as disk drives. The control unit includes a buffer for temporarily storing data sent by the central processing complex to be written to one or more of the DASDs. The central processing complex and the control unit operate in a master/slave relationship. The sending of data between the central processing complex channel and the control unit requires a number of handshaking messages to be sent between the two before data can start to be transmitted. The time it takes to do this handshaking slows down the performance of the data transfer significantly.

Various techniques have been employed to gain a marginal improvement in performance. One such technique involves a "shadow write" operation wherein the data transmitted by the central processing complex is buffered in the control unit but not written to DASD until later. Nevertheless, the central processing complex is notified by the control unit that the write operation has taken place, thereby eliminating the time delays normally associated in the electromechanical write operations.

Multiprocessor (MP) systems have been developed to increase throughput by performing in parallel those operations which can run concurrently on separate processors. Such high performance, MP data processing systems are characterized by a plurality of central processor units (CPUs) which operate independently and in parallel, but occasionally communicate with one another or with a main storage (MS) when data needs to be exchanged. In the type of MP system known as a tightly coupled multiprocessor system in which each of the CPUs have their own cache memory, there exist coherence problems at various levels of the system. A number of solutions to this problem are known in the art. One approach involves a cross-interrogate (XI)-technique to insure that all CPUs access only the most current data.

Recently, there have been developed massive electronic storage devices which are replacing the slower, electromechanical DASDs used in older systems. These electronic storage devices, while representing a significant increase in the speed of MP systems, do not address the prior problem associated with the handshaking protocol of prior systems. Added to that is the cross-interrogate (XI) process that generally characterize memory management in a tightly coupled MP system.

There are also known data processing systems in which a plurality of central processing complexes (CPCs) are interconnected via a communication link. The CPCs run independently but must communicate with one another to transfer and/or process data. The CPCs may be large main frame computers which communicate via some message processor, or they may be a plurality of individual work stations communicating over a local area network (LAN) or wide area network (WAN) which might typically include a server. In either case, communication is typically handled in a master/slave relationship, even between large main frame computers. The master/slave designation changes depending on the flow of data, but the type of handshaking protocol described for I/O devices is typical resulting in delays in data transfer.

High speed data processing systems and elements are being developed wherein the communication process is, in many cases, the limiting factor in data throughput. The transmission capacities of the media, notably copper, has been a limiting factor in the performance of communications. New media, such as optical wave guides, e.g., fiber optic cables, have significantly higher transmission capabilities than was possible with previous media. There is considerable need for overall improvement in data communications and data throughput in high performance data processing systems.

SUMMARY OF THE INVENTION

It is therefore an object of the present invention to provide low latency channels for high performance data processing systems.

It is another object of the invention to provide true peer-to-peer communications between central processing complexes in a data processing network.

It is a further object of the invention to provide a protocol which supports recovery of individual operations in a multiple operation environment.

According to one aspect of the invention, buffers are provided in two elements between which data is to be transferred wherein both buffers are dedicated solely by the originator of the data transfer. In other words, the master/slave relationship communications of the prior art, and its attendant protocols, is eliminated by the subject invention. Only one transfer is required to transmit a message, and a second transfer acknowledges the completion of the function because message delivery to the receiver is guaranteed under the protocol implemented by the invention.

A message operation includes the exchange of up to four pieces of information. A request part is always passed from the originator of the message to the recipient. A response part is always passed from the recipient to the originator. Optional data parts may be passed from the originator to the recipient or from the recipient to the originator. Both, one or none of the data parts may be part of a given message.

The channels of the originator and the recipient are physically connected by a link. The link media, whether copper, fiber optic or other media, is presumed lossy. The loss of a portion of a message results in an error for the message. The corrective action of an error is to cancel the message, such that another message can be sent on another channel and there is no race condition between the original message that failed and the second message.

As a result, there are times when an operation must be canceled, as for example, when the originator does not receive an acknowledgment of the completion of the function. Therefore, when a request is sent by an originator, a message timer is started by the sender. When the normal response for the request is received, the timer is reset. A message timeout may span a number of message-level exchanges. An example is cross-interrogate (XI) messages generated as a result of execution of a write command to a message-processor that is a shared memory structure. The cross-interrogates are sent to the users of the shared memory structure.

If the message timer times out, whether due to no response or a response out of time, a recovery procedure is initiated. This recovery procedure involves canceling the original operation so as to clear the buffer at the recipient and assure the originator that it can issue another request without fear that it may be canceled by an earlier cancel operation request.

When an operation must be canceled, a cancel operation command is issued. However, when the cancel operation fails to get a response, one would like to be able to issue more cancel operation commands until the operation is canceled. There is a problem of determining to which cancel operation command the recipient is to respond; that is, is the recipient responding to the first, the last, or a command in between after several cancel operation commands have been issued.

According to a second aspect of the invention, if additional cancel operation commands are sent as the result of a failure of the first or subsequent cancel operation commands, a secondary command that is different from the cancel command is required to be issued and responded to prior to marking the operation as being canceled. Since the commands must be executed in the sequence in which they are received, a response to the secondary command ensures that there are no other cancel operation commands remaining in the receiver, allowing subsequent operations to start without danger of being canceled.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a high level block diagram of a high performance channel according to the invention;

DETAILED DESCRIPTION OF A PREFERRED EMBODIMENT OF THE INVENTION

Figure 1:
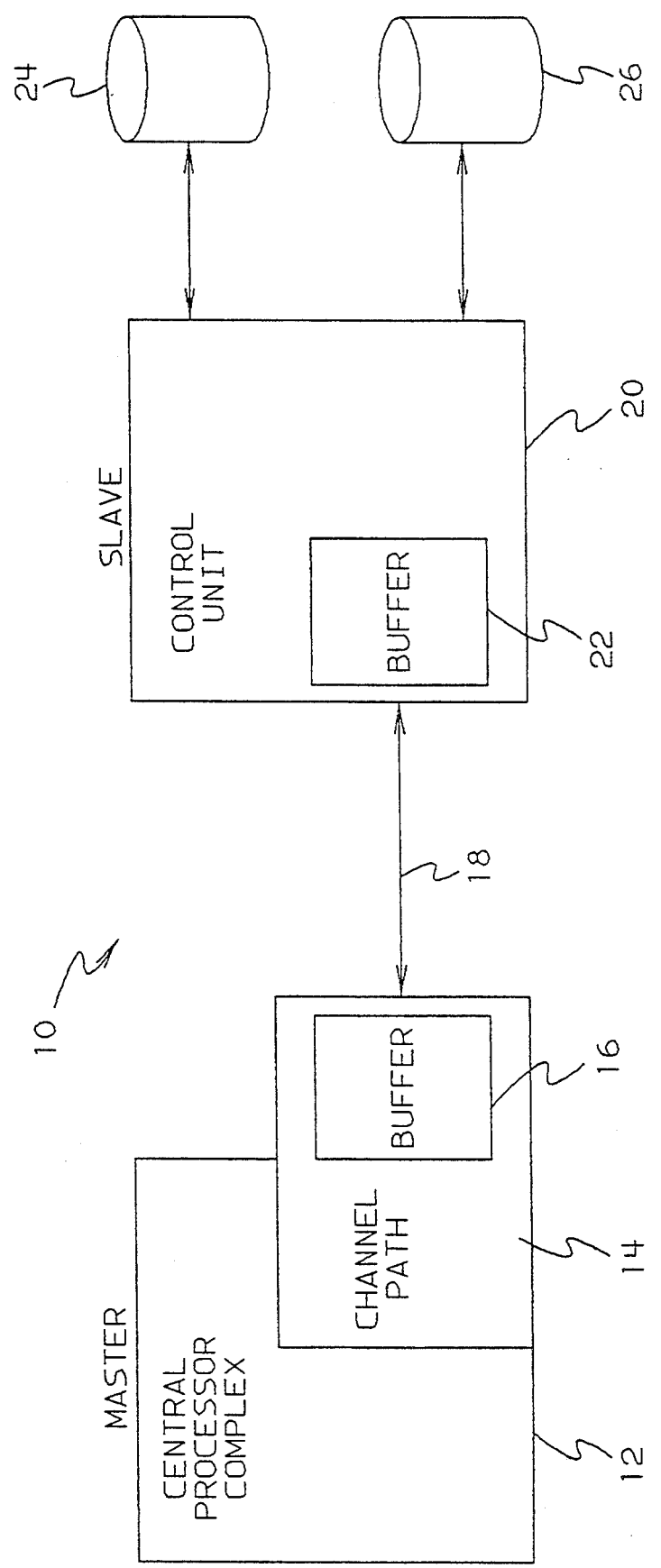
FIG. 1 is a high level block diagram of a conventional I/O system for a central processor complex.

Referring now to the drawings, and more particularly to FIG. 1, there is shown a block diagram of a typical I/O system 10 for a central processing complex (CPC) 12. The CPC 12 typically includes a CPU (not shown) and various supporting buffers, registers and the like, none of which is shown since the structure is well known in the art. The CPC 12 includes one or more channel paths 14, only one of which is shown for the sake of clarity. The channel path 14 has an attached message buffer 16 and is connected via cable 18 to a control unit 20. The cable 18 may be any suitable media such as, for example, copper wires.

The control unit 20 includes a buffer 22 and includes a microprocessor (not shown) which controls the buffer 22 and communications with one or more strings of DASDs 24 and 26. The DASDs 24 and 26 typically are disk drives having rotating magnetic media on which data is written by electromechanically indexed read/write heads.

The relationship between the CPC 12 and the control unit 20 is that of master and slave. That is, commands are issued by the CPC 12 to the control unit 20 which executes the commands. For example, the CPC 12 after processing data may want to write the results of the computations to one of the DASDs connected to the control unit 20. This is done according to the protocol generally shown in the flow chart of FIG. 2. First, the CPC 12 issues a connect request by loading the request in buffer 16 and then transmitting it over cable 18 to buffer 22. Since the control unit 20 controls the buffer 22, it must first notify the CPC 12 that the buffer 22 is ready to receive data and how many bytes of data can be sent before the CPC must wait for an acknowledge to send additional data (a pacing value), and this is done by issuing a connection grant message back to the CPC 12.

Figure 2:
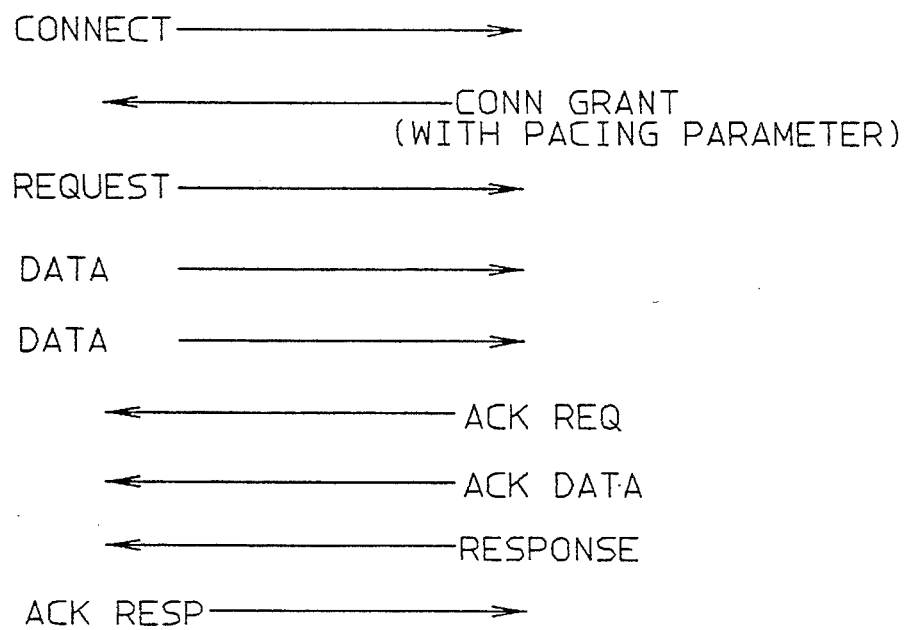
FIG. 2 is a flow chart showing a typical handshaking protocol for the I/O system shown in FIG. 1.

Once the connection has been made between the CPC 12 and the control unit 20, the CPC 12 then issues a request message, which for this example is to write data to one of the DASDs. The request message is a command which the control unit 20 responds to by preparing to write data to a DASD. The request message is followed by one or more frames of data which are temporarily stored in the buffer 22. Each frame of data is acknowledged by the control unit 20. Acknowledgements must be received for the CPC 12 to send additional frames of data that exceed the pacing value established by the connection grant. In the protocol as illustrated in FIG. 2, no such separate acknowledge messages are sent by the control unit 20 to the CPC 12. Rather, it is assumed that for purposes of this illustration the original request message transmitted by the CPC 12 to the control unit 20 includes a field that indicates the number of bytes to be transmitted.

As the request frame and data frames are received and recognized by the control unit 20, acknowledgements for the received and recognized frames are sent. The control unit 20 transmits first a request acknowledge (ACK) message and then data ACK messages to the CPC 12 if (1) the request message was one which could be understood by the control unit 20 and (2) the data frame was correctly received. The latter is typically determined by cyclic redundancy codes (CRCs) transmitted with the data as part of the frame. The ACK message to the data frames can be sent as a separate ACK for each received data frame or as an ACK to several data frames as shown in FIG. 2.

As mentioned, the process can be enhanced by adopting a "shadow write" function in the control unit 20 in which data is temporarily stored before actually writing to the DASD but transmitting a response to the CPC 12 that the write operation has taken place. The response, in effect, signals the CPC 12 that the command (e.g., write data) in the original request message has been successfully completed. The CPC 12 then issues an ACK response to the control unit 20 thereby ending the connection. Where the shadow write function has been implemented, it is after this time that the actual data write operation to DASD takes place.

It will be appreciated by those skilled in the art that the protocol illustrated in FIG. 2 incorporates several features that improve throughput of data processing systems over the conventional system shown in FIG. 1. For example, the protocol shown in FIG. 2, by eliminating the need for multiple ACK messages, has significantly eliminated handshaking delays which were common in older systems. In addition, since the write times to electromechanical DASDs is measured in milliseconds (msec.) while the communication time delays over the copper cable 18 is measured in microseconds (μsec.), a significant delay in the write data operation is eliminated by the "shadow write" function.

Recent developments in system and element design, however, have made these prior approaches obsolete. First, the slower electromechanical DASDs are being replaced by electronic storage elements offering large amounts (e.g., hundreds of MBs) of high speed data storage. Second, microprocessors (i.e., the data processing engines) are being steadily improved providing increased speed and throughput. Third, optical waveguide systems, including fiber optic cables, are coming into increasing use in data processing systems. Transmission times on fiber optic cables are measured in gigabits per second rather than tens of megabits per second. The speed of propagation in the transmission mediums remains relatively constant across all media, about 0.75 times the speed of light. Coupled with these recent developments in allied arts is a tendency to implement more complex data processing systems which may have relatively diverse geographic dispersion of elements. Thus, even though high speed media, such as fiber optic cables, have resulted in an order of magnitude decrease in transmission times, the distances over which the transmissions take place still result in significant time delays relative to the speed of operation of the electronic components.

The subject invention addresses this problem by implementing a new system of low latency communications which completely eliminates the master/slave relationship commonly employed in the prior art. As an added benefit, the system according to the invention provides true peer-to-peer communications between elements in a data processing system, whether those elements be a CPC and an I/O unit or multiple CPCs or any combination thereof.

FIG. 3 shows a block diagram of the basic architecture of the invention which, for sake of comparison, is similar to the I/O system shown in FIG. 1. This I/O system 30, like that of FIG. 1, employs a CPC 32 having a channel path 34 and an attached message buffer 36 connected to a transmission media 38, such as a fiber optic cable. However, unlike the I/O system shown in FIG. 1, the I/O system 30 in FIG. 3 has an electronic element 40 which includes a buffer 42. Again, making the analogy to the I/O system shown in FIG. 1, the electronic element 40 includes electronic storage 44, replacing the electromechanical DASDs of the prior art.

The obvious speed enhancements provided by fiber optic cable and electronic storage, however, are only partially realized if the master/slave relationship and protocol of the prior art were incorporated in the system shown in FIG. 3. As will become clear in the description which follows, the buffer 42 in the electronic element 40 is dedicated to the CPC 32. This buffer is divided into three parts, a request or command part, a data part and a response part designated "C", "D" and "R", respectively. A request message (i.e., command) followed by data is loaded into buffer 36 and transmitted in that order to the buffer 42. The command is loaded into the "C" part of buffer 42 and immediately decoded. The decoded operation (e.g., write data) then awaits the reception of the data in the "D" portion of the buffer 42, and as soon as all the data has been received, the command is executed by, in the example described, writing data to the electronic storage 44. As soon as the command has been executed, the electronic element 40 then transmits a response to the CPC 32 which is received in the "R" part of buffer 36.

Figure 4:
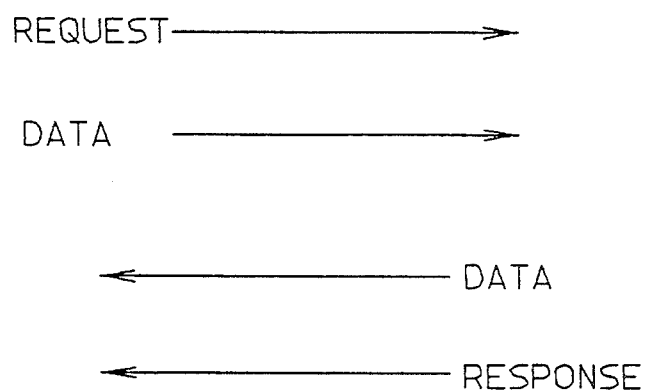
FIG. 4 is a flow chart showing the communications protocol implemented in the high performance channel shown in FIG. 3.

The new protocol according to the invention is illustrated in the flow chart of FIG. 4. Since the buffer 42 is dedicated to the CPC 32, there is no requirement for the connect request and connect grant as was required in the protocol illustrated in FIG. 2. A write operation for the protocol shown in FIG. 4 would be (1) the request and the data are transmitted immediately by the CPC 32 over the fiber optic cable 38 to the buffer 42, and as soon as the command is executed, (2) the electronic element 40 provides a response to the CPC 32. Thus, only one transfer is required to transmit a message (request plus data), and the second transfer acknowledges the completion of the function. Similarly, a read operation follows the same protocol, except the data is sent from the electronic element 40 to the CPC 32. Also, an operation that makes a calculation and returns data would have data going from the CPC 32 to the electronic element 40 returning data to the CPC 32. In the preferred implementation of the invention, the operation described is synchronous; that is, the CPC 32 waits until it receives a response from the electronic element The electronic element 40 may itself be another CPC. As will be described hereinafter, true peer-to-peer communications is supported by the invention by providing each CPC and electronic element in the system with complementary sets of buffers. Thus, the electronic element 40 may communicate directly and synchronously with the CPC 32 without adopting an asynchronous interrupt procedure as currently used in the art.

Moreover, the invention is not limited to I/O systems. For example, the electronic element 40 shown in FIG. 3 may be a super computer used as a co-processor for one or more CPCs. The co-processor would be required from time-to-time to perform a calculation or a series of calculations based on a request from a CPC, the results of which would be sent as the return data by the co-processor to the requesting CPC. That is, the CPC would send a request followed by the data to be operated on by the co-processor, and the co-processor would send the data generated as a result of its calculations to the CPC followed by a response using the same protocol just described.

Figure 5:
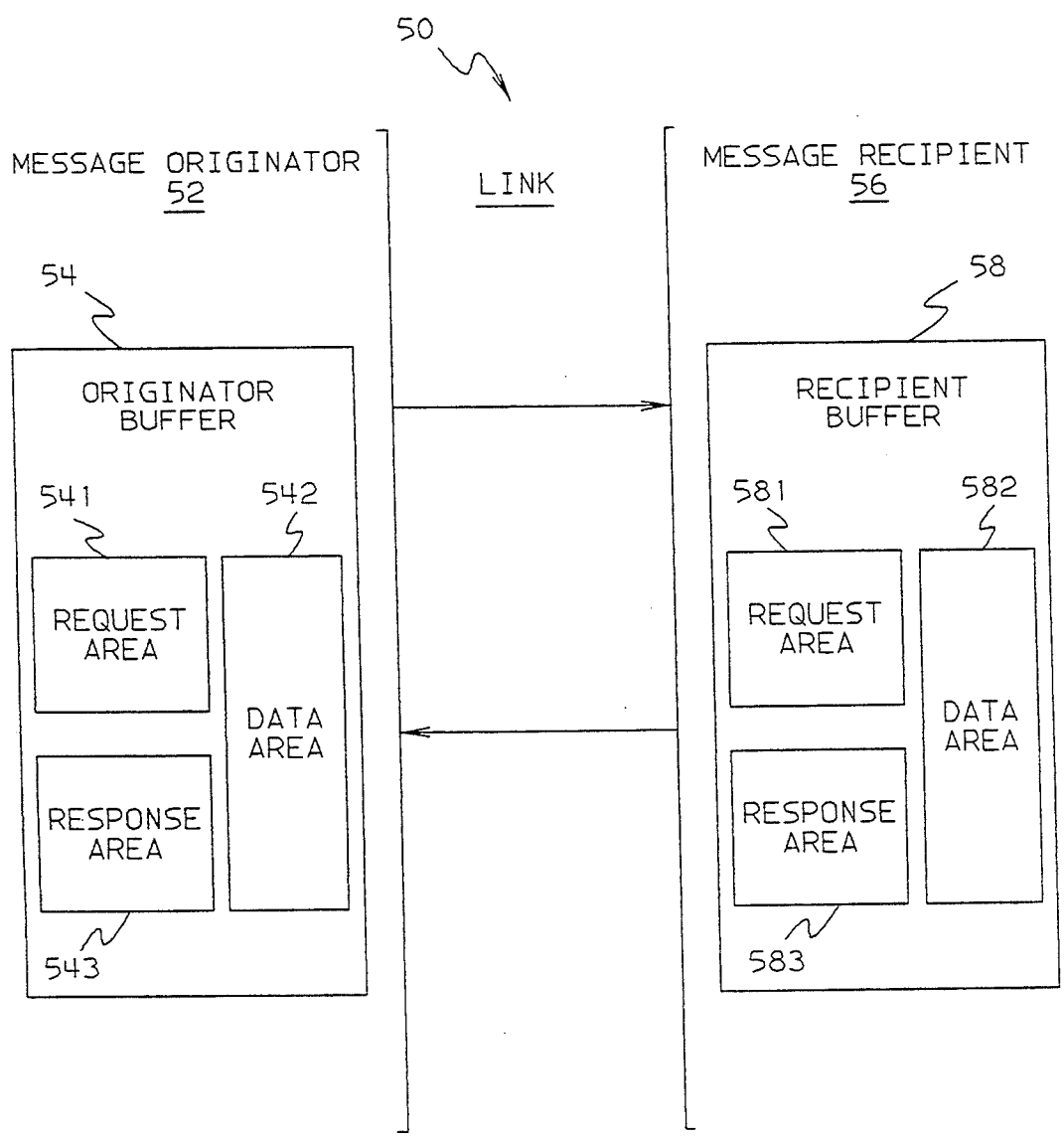
FIG. 5 is a block diagram of high performance channel message buffers for a message originator and a message recipient as used in the practice of the invention.

FIG. 5 shows the buffer design for a single message on a high performance link spanning the high performance channels at both ends of a link 50. Physical buffers are built into the high performance channel at each end of the link in support of a single message. The physical buffers at each end of a link that are required to support the transmission of a single message are called a message buffer.

Logically, there are two types of buffers in a CPC or electronic element. The first type, called the originator buffer, is used for messages operations that originate at that CPC or electronic element. The second type, called the recipient buffer, is used for operations that originate at the other end of the link, i.e., the electronic element or CPC. An originator buffer 54 is composed of the physical buffers used for message operations that originate at the message originator 52. A recipient buffer 58 is composed of the physical buffers used for operations that originate at the other end of the link. An originator buffer 54 at one end of the link and a recipient buffer 58 at the other end of the link comprise a high performance channel message buffer. A high performance channel message buffer is capable of providing all the buffering required for a single message to be transmitted from the originator to the recipient and for the associated response and data to be transmitted back.

Both originator and recipient buffers have three logical areas: (1) a request area, (2) a response area, and (3) a data area. More specifically, the originator buffer 54 comprises a request area 541, a data area 542 and a response area 543. The recipient buffer 58, in turn, comprises a request area 581, a data area 582 and a response area 583. Of these, the data area 542, response area 543, request area 581, and data area 582 need to be physical buffers. The request area 541 could be a virtual address in the memory of message originator 52, and the response area 83 could be a virtual address in the memory of message recipient 56.

The message buffers at a high performance channel are allocated for use on a message basis. Information is buffered at each end of the link to ensure that there is a place for a received frame to be placed and to compensate for speed mismatches among the link, the originating unit and the receiving unit.

The request information for the message operation is sent from the request area 541 of the originator buffer 54 to the request area 581 of the recipient buffer 58. The response information is returned from the response area 583 of the recipient buffer 58 to the response area 543 of the originator buffer 54. The data areas 542 and 582 of the originator buffer 54 and the recipient buffer 58, respectively, are used for transmitting and receiving additional information that is needed for command execution. The direction of data flow depends on the command being executed. Data may flow in both directions for a given operation. All the data must be received by the message recipient before the data areas 582 and 542 can be used for the results data.

Messages that are to be sent from the message originator to the message recipient place the command to be executed in the message originator's request area 541 and any data that may accompany the command in the message originator's data area 542. The request area contents are sent to the message recipient's request area 581, and the data contents are sent to the message recipient's data area 82. The message recipient, upon receiving a command in its request area, immediately decodes the command and starts execution of the command up to the point that data is required. When the data is received, execution of the command is completed and the result is placed in response area 583 and any data that may accompany the response in data area 582. The message recipient's data area contents are sent to the message originator's data area 542, and then the message recipient's response contents are sent to the message originator's response area 543, and the message operation is complete.

Figure 6:
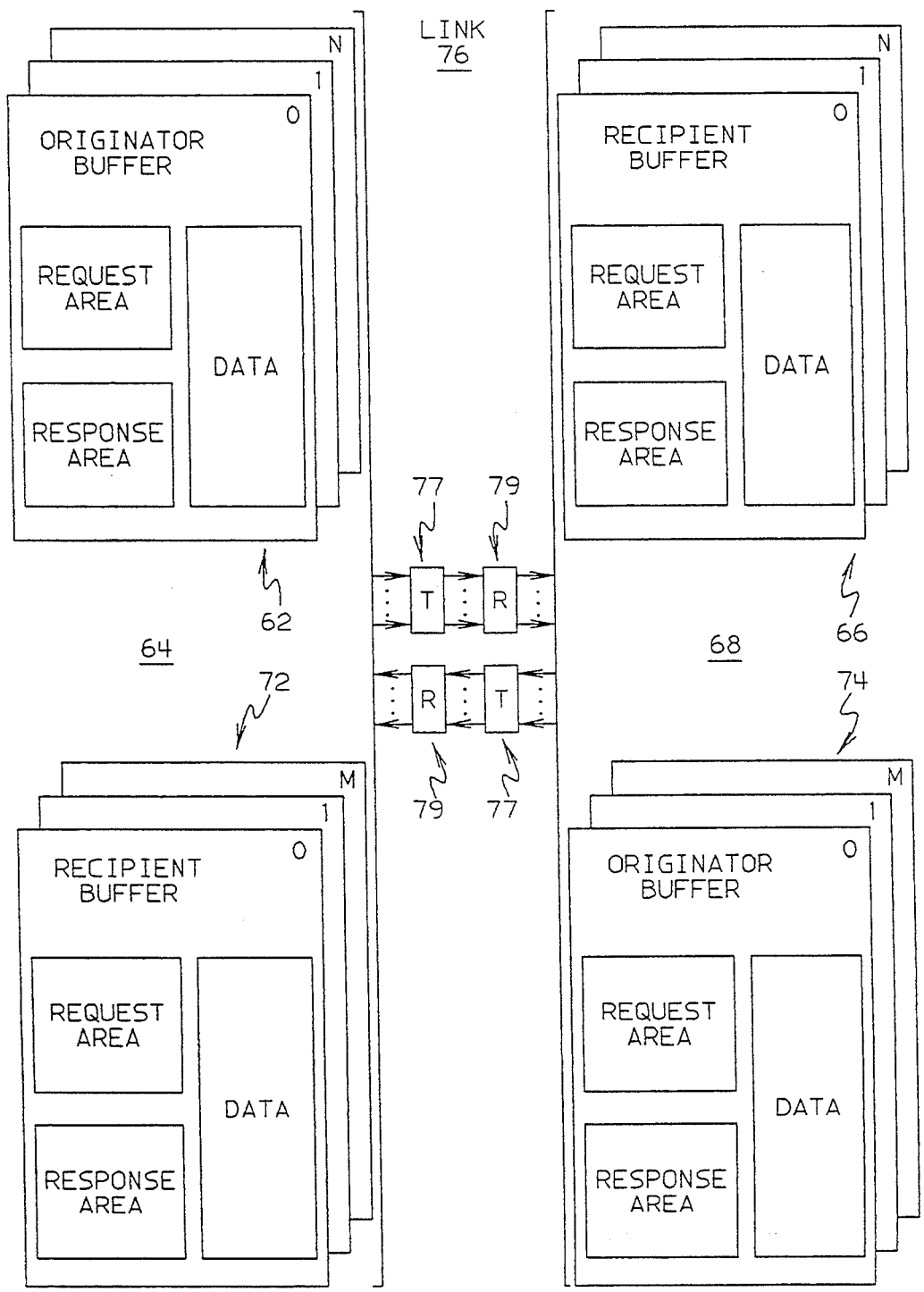
FIG. 6 is a block diagram illustrating high performance channels with multiple message buffers for peer-to-peer operations.

A high performance channel requires a minimum of one originator buffer or one recipient buffer. A high performance channel may have more than one originator buffer or more than one recipient buffer. A channel may also contain both originator and recipient buffers. A high performance channel is not required to provide the same number of originator and recipient buffers. FIG. 6 illustrates all elaboration of the basic buffer structure that supports multiple buffers for peer-to-peer operations. This modification allows multiple originator buffers and recipient buffers to exist in a single high performance channel. There are, for example, N+1 originator buffers 62 (numbered 0 to N) in CPC 64 and corresponding N+1 recipient buffers 66 in CPC 68. In addition, there are M+1 originator buffers 72 (numbered 0 to M) in CPC 68 and corresponding M+1 recipient buffers 74 in CPC 64. These buffers are connected via a link 76 comprising a plurality of transmitters and receivers 77 and 79. The number and organization of the buffers at both ends of the link determines the degree of concurrency that may be achieved using the high performance channel according to the invention.

During the initialization of the system, the connected channels exchange information which enable the establishment of the message buffers. Each channel will inform its counterpart channel on the other end of the link, of its capacity for recipient buffers. For the example depicted in FIG. 6, the channel in CPC 68 would inform the channel in CPC 64 that it is capable of supporting N+1 recipient buffers of a specified size (size of request and data areas) to support the required number of message operations. The channel in CPC 64 would evaluate whether or not N+1 recipient buffers of the specified size are sufficient to support message operations. If the recipient buffers are insufficient to support message operations, the channel in CPC 64 will not establish originator buffers, and message operations will not commence. If the N+1 recipient buffers are satisfactory to the channel in CPC 64, then it will establish the number of originator buffers which it requires for message operations. The number of originator buffers established in a channel does not have to equal the number of recipient buffers established in the connected channel. For example, if the channel in CPC 68 indicated that it was able to provide 10 recipient buffers, and the channel in CPC 64 only required 2 originator buffers for message operations, then the channel in CPC 64 would only establish 2 message buffers. Therefore, the N+1 number of originator buffers in the channel in CPC 64 and the M+1 number of originator buffers in the channel in CPC 68 is the maximum number of originator buffers which could be established for the system depicted in FIG. 6. There does not have to be a one to one correspondence between the number of originator and recipient buffers, but there has to be one recipient buffer for every originator buffer in order to establish a message buffer.

For each message buffer that exists (i.e., originator/recipient buffer pair), one message operation can take place. Thus, the multiple message buffer structure illustrated in FIG. 6 allows multiple messages to be in execution concurrently. Furthermore, these message operations can occur simulteneously in both directions on the link 76. Messages can originate from either the channel in CPC 64 or the channel in CPC 68.

Figure 7:
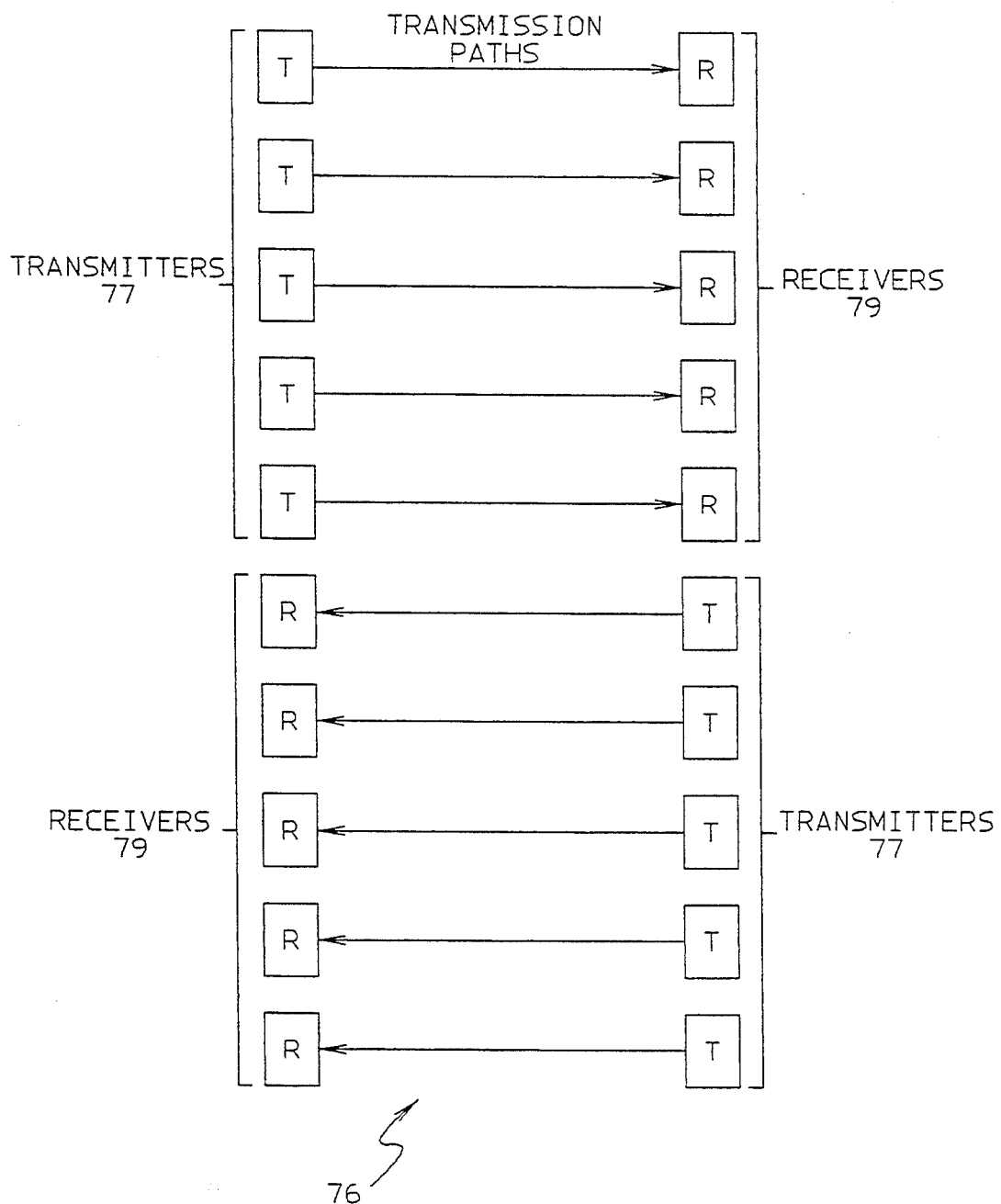
FIG. 7 is a block diagram showing a high performance link between a message facility and a message processor according to the invention.

The high performance link 76 is made up of a number of conductors with transmitting and receiving circuits located at the both ends of the link, as shown more particularly in FIG. 7. The link has essentially two transmission paths connecting the channels. One transmission path comprises a set of conductors sending signals from the high speed channel at one end of the link to the high speed channel at the other end of the link. The second transmission path is another set of conductors used to transmit signals in the opposite direction on the link, allowing information to flow in both directions simultaneously. In a preferred embodiment of the present invention the conductors of the transmission paths are optical fibers but can be constructed from copper wire or even radio or infrared signals.

The functions of the high performance channel are separated into two levels; the link-level protocol, which defines the frames and sequences needed to manage the physical connection, and the message-level protocol, which uses the functions and services of the link-level. The link-level functions include obtaining synchronization, initializing and configuring the link, and signaling error and offline conditions. The request and response frames are transmitted in accordance with the message-level protocol.

Figure 8:
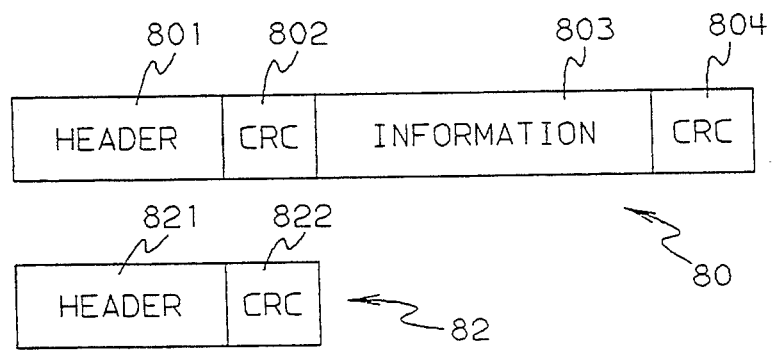
FIG. 8 is a block diagram showing the frame structures according to the high performance link protocol implemented by a preferred embodiment of the invention.

FIG. 8 shows the frame structures by which information is transferred over a high performance link, each frame being transferred on a single transmission path as illustrated in FIG. 7. There are basically two types of frames; an information frame 80 and a control frame 82. The information frame 80 consists of a header (HEADER) 801, its associated cyclic redundancy code (CRC) 802, a variable-length information or data field 803, and a CRC 804 associated with the data field 803. The control frame 82 contains no information or data and, therefore, consists only of a header 821 and a CRC word 822. The header is identifies the frame format, frame type, frame destination, and provides values used in frame processing.

Figure 9:
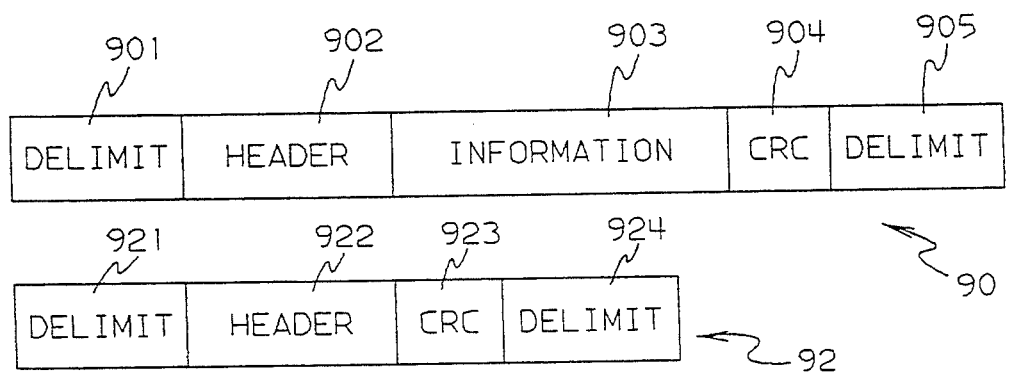
FIG. 9 is a block diagram showing conventional frame structures typically used in prior art message protocols.

The prior art typically employs more complex frame structures as shown in FIG. 9. Again, two types of frames, an information frame 90 and a control frame 92, are employed. The information frame 90 consists of a delimiter (i.e., START) 901, a header 902, a variable-length information or data field 903, a CRC 904, and a delimiter (i.e., STOP) 905. The control frame 92 contains no information or data but, nevertheless, contains a delimiter 921, a header 922, a CRC 923, and a delimiter 924. Not only is the frame structure shown in FIG. 9 more complex than that used by the invention requiring more time to process, it is considerably longer taking more time to formulate and transmit.

Figure 10:
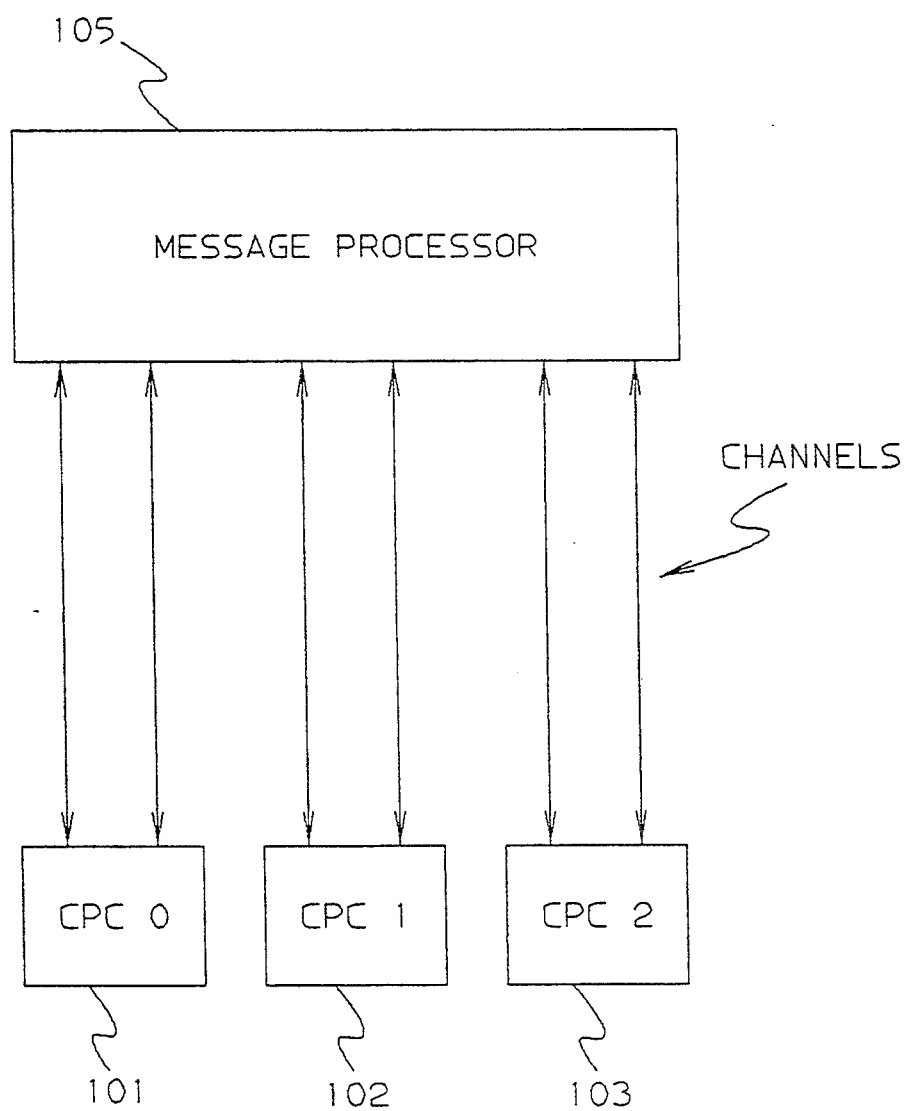
FIG. 10 is a high level block diagram showing a network of central processing complexes (CPCs) connected to a message processor by high performance channels according to the invention.

There may be more than one link connecting CPCs in various combinations in multiprocessor systems. This is illustrated by the network of coupled CPCs shown in FIG. 10. Each of the CPCs 101, 102 and 103 are connected to a message processor 105 by high performance channels according to the invention as illustrated in FIG. 6. The message processor may be, for example, an electronic element performing a memory storage function as described, for example, with reference to FIG. 3; however, it will be understood that a storage facility is but one type of message processor. As mentioned, the electronic element may itself be a CPC or a co-processor, such as a super computer. Alternatively, the message processor 105 may be a server as in a LAN or WAN, where at least some of the CPCs 101, 102 and 103 are work stations. Moreover, those skilled in the art will recognize that the network shown in FIG. 10 is illustrative. A practical data processing system may, for example, include a plurality of message processors 105 (e.g., servers, co-processors, etc.) all interconnected with the CPCs 101, 102 and 103.

For the example illustrated in FIG. 10 where the message processor 105 is a storage facility, assume a tightly coupled multiprocessor (MP) system where each CPC 101, 102 and 103 has its own cache memory. As in prior art MP systems, a cross-interrogate (XI) procedure is required to maintain cache coherency. The peer-to-peer communications supported by the invention substantially speeds up this procedure. This is made possible by the ability of the message processor 105 to send an unsolicited cross-interrogate request to CPCs 101, 102 and 103. In the prior art, an interrupt request would be sent that would fetch the cross-interrogate command, then execute the cross-interrogate and finally send a response to the end the operation.

While the high performance channels according to the invention allow multiple messages to be in progress at the same time in a single high performance link, occasionally an operation must be canceled. As mentioned, the preferred embodiment of the invention supports synchronous operation where the message originator waits for a response from the message recipient. The transmission media is lossy, and there may be occasions when the transmitted message becomes garbled. In that case, the receiver of the information simply ignores the received message. The link itself may become damaged and the message is therefore never received. In addition, a message response period may span a number of message-level exchanges. An example is cross-interrogate (XI) messages that are generated as the result of execution of a write cache command executed by the electronic element.

Since synchronous operation is being supported, it is therefore necessary for the message originator to set a timer for messages sent to the message recipient. If no response is received within the timed period for response, the message is said to have timed out. When a single message times out, a series of requests and responses are issued for the single high performance channel message that timed out. If the requests and responses are successful for the message, then only the single message that timed out is aborted. The operation cancel request/response and operation cancel complete request/response operate on a message buffer basis and are addressed to the message buffer that has timed out. If the operation cancel request/response and operation cancel complete request/response complete successfully, only the message in the affected message buffer is aborted and the high performance channels can continue operations with all of the message buffers. Timeouts are provided for link-level and message-level exchanges.

When a message times out, the following procedure is used:

1. An operation cancel request is sent for the message operation that timed out. A high performance channel receiving an operation cancel request ensures that no response is sent to the timed out message request. This may be done by causing any command in the specified message buffer to be forward completed or backed out, or other methods may be used. After the high performance channel has ensured that no response will be sent for the request, an operation cancel response is performed.

2. If an operation cancel response is returned after a single operation cancel request is issued, a message to that effect is returned to a channel with status indicating that the message has failed. If an operation cancel response is not returned within an operation cancel response time out period, then the operation cancel request is sent again up to a model-dependent threshold. If the threshold is met, the high performance channel is no longer operational and a message indicating the failure of all messages in the active message buffers and high performance channel is returned to the CPC or electronic element.

3. If the operation cancel request times out, the subsequent operation channel request is issued and an operation cancel response is returned, then an operation cancel complete request/response exchange must take place prior to the channel being presented with status indicating that the message for the message buffer has failed.

4. If an operation cancel complete response is returned after a single operation cancel request was issued, a message is returned to a channel with status indicating that the message has failed. If an operation cancel complete response is not returned within an operation cancel complete request time out period, then the operation cancel complete request is sent again up to a model-dependent threshold. If the threshold is met, the high performance channel is no longer operational and a message indicating the failure of all messages in the active message buffers and the high performance channel is returned to the CPC or electronic element.

5. If the operation cancel complete request times out, one or more subsequent operation cancel complete requests are issued and an operation cancel complete response is returned, then the channel is presented with status indicating that the message for the message buffer has failed.

6. When the high performance channel is no longer operational due to the timeout procedure failing, all requests received are terminated. Messages that originated in a high performance channel are returned with an indication that the message has failed.

Using this method of timeout recovery for messages on high performance channels, single messages that timeout can be recovered without affecting other operations that are taking place at the same time in the same high performance channels. Only when a high performance channel is non-responsive to multiple sets of commands are all messages in progress affected.

Figure 11:
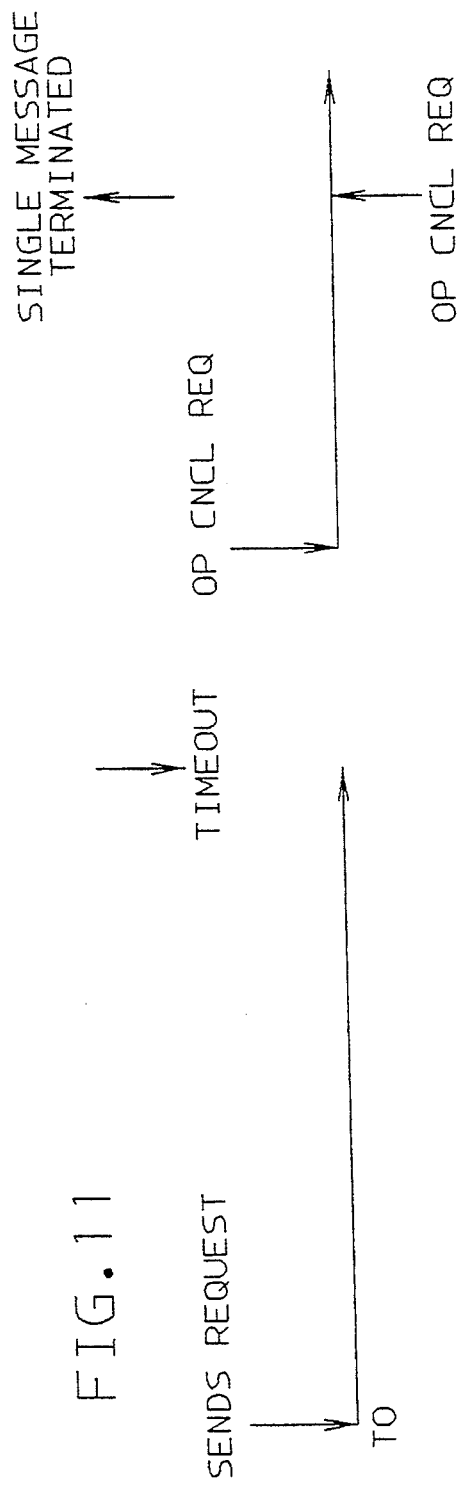
FIG. 11 is a timing diagram showing a timeout procedure for a lost message response.

Referring to FIGS. 11 to 14, there are shown examples of the timeout procedure for a lost message response according to the invention. In FIG. 11, the message originator sends a request at time $T_O$ and at the same time sets its timer to, for example, 150 $\mu$sec. Upon timeout of the timer, the message originator sends a operation cancel request (OpCncl Req), but this time sets its timer to, say, 15 $\mu$sec. In the case illustrated in FIG. 11, the message recipient responds to the operation cancel request with an operation cancel response (OpCncl Rsp) within the 15 $\mu$sec. time period. The response signifies that the message recipient has ensured that no response is to be returned for the message buffer. The single message is terminated at the message originator by returning a message to the channel with status indicating that the message for the message buffer has failed.

Figure 12:
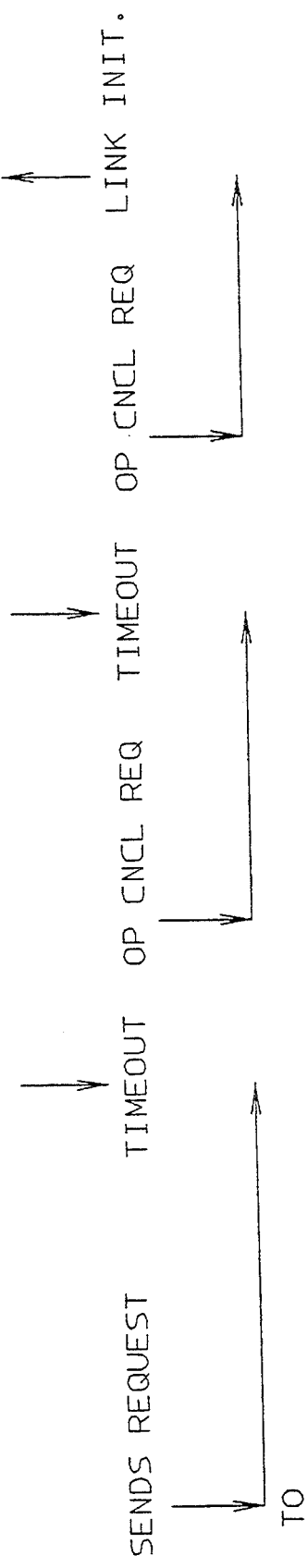
FIG. 12 is a timing diagram showing a timeout procedure for a lost message response and no response to an operation cancel request.

FIG. 12 illustrates the case where instead of receiving an operation cancel response from the message recipient, the operation cancel request times out. This causes the message originator to transmit a second operation cancel request, again setting its timer to 15 $\mu$sec. as in the preceding example. In the case illustrated in FIG. 12, the link-level protocol initiates a termination of all messages on the link due to the operation cancel request being sent and not respond to the model-dependent threshold number of times (two being the threshold in the example shown in FIG. 12).

Figure 13:
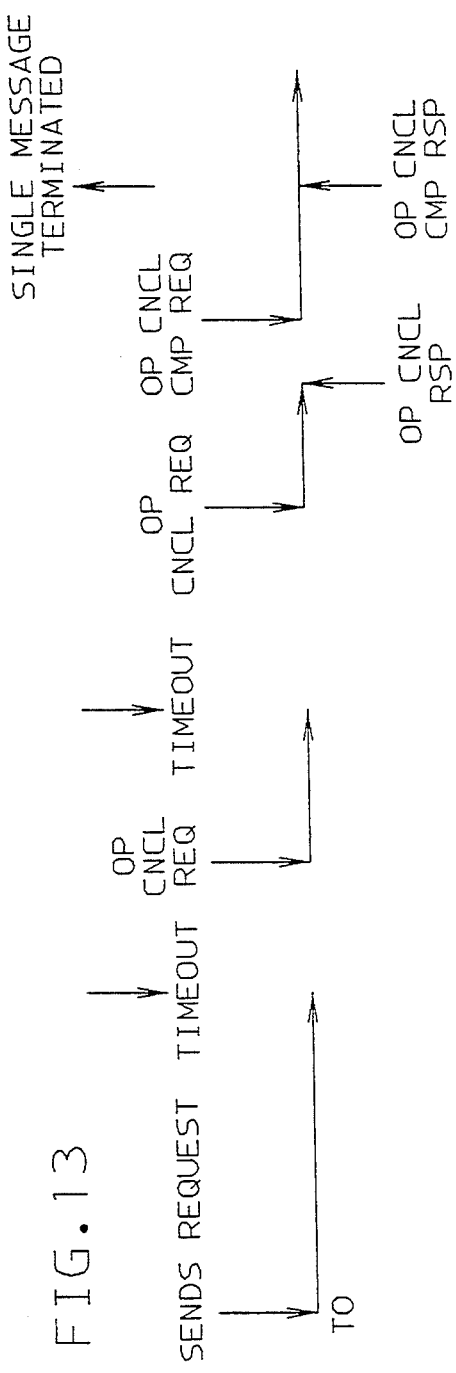
FIG. 13 is a timing diagram showing a timeout procedure for a lost message response and a lost first operation cancel request.

FIG. 13 assumes a scenario similar to that of FIG. 12 except that the operation cancel response is received during the second 15 $\mu$sec. time period. However, there is an ambiguity because it is not known whether the received operation cancel response is in response to the first or the second operation cancel requests. As a result, a danger exists that a subsequent request from the message originator will be canceled by the message recipient in response to an outstanding operation cancel request. Therefore, the message originator next sends an operation cancel complete request (OpCanclCmp Req) to the message recipient, again setting its timer for 15 $\mu$sec. During this third 15 $\mu$sec. time period, the message recipient returns an operation cancel complete response (OpCnclCmp Rsp) to the message originator. This response results in the single message being terminated with status indicating that the message for the message buffer has failed.

Figure 14:
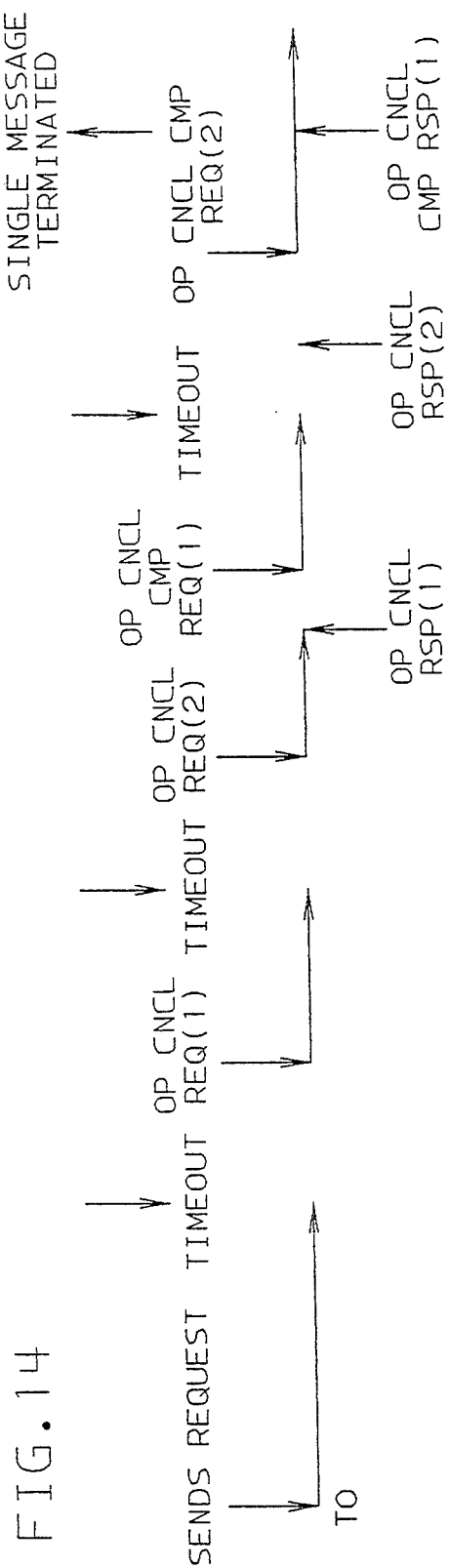
FIG. 14 is a timing diagram showing an overview of the timeout procedure for lost message response and a delayed execution of operation cancel requests.

FIG. 14 assumes a somewhat more complicated scenario wherein, as in FIG. 13, two operation cancel requests are transmitted by the message originator and, during the timeout period of the second request, an operation cancel response from the message recipient is received. In the case illustrated, the response is received as a result of the first operation cancel request, but there is no way of knowing this at the message originator. Therefore, the message originator transmits an operation cancel complete request, setting the timer for a third 15 μsec. time period, as was done in FIG. 13. In this example, however, the timer times out without receiving a response to the operation cancel complete request. Now, the second operation cancel response is received while the message originator is transmitting a second operation cancel complete request due to the time out, and is setting its timer for a fourth 15 μsec. time period. During this time period, the operation cancel complete response is received. This response may be in response to the first operation cancel complete response, as indicated in FIG. 14, and results in the single message at the message originator being terminated. The cancel complete response signifies that the message recipient has completed all cancel operation requests prior to the cancel complete request and no response will be returned for the message in the message buffer. Any cancel complete responses received after the first are discarded after the message buffer has been released.

While the invention has been described in terms of several preferred embodiments and applications, those skilled in the art will recognize that the invention can be practiced with modification within the spirit and scope of the appended claims.

Having thus described our invention, what we claim as new and desire to secure by Letters Patent is as follows:

1. High performance communications channels for exchanging messages with low latency between elements of data processing systems, each of said communication channels comprising:

an originator buffer in a message originator element and a recipient buffer in a message recipient element, said message originator element containing a plurality of originator buffers and said message recipient element containing a plurality of recipient buffers, an originator buffer of said plurality of originator buffers being paired with a recipient buffer of said plurality of recipient buffers, each of said originator buffer and said recipient buffer being composed of three logical areas designated as a request area, a response area and a data area, respectively, said request area for storing request messages, said response area for storing response messages and said data area for storing data, each of said three logical areas being separate from one another, each of said originator buffers and said recipient buffers being hardware communications buffers;

a transmission path connecting said originator buffer and said recipient buffer;

said message originator element managing both said originator buffer and said recipient buffer and transferring a message request from the request area of said originator buffer to the request area of said recipient buffer without requiring a correct request signal and a correct grant signal from said originator buffer and said recipient buffer, respectively, and, selectively transferring message data from the data area of said originator buffer to the data area of said connected recipient buffer; and said message recipient element responding by transferring a message response from the response area of said recipient buffer to the response area of said originator buffer and, selectively transferring message data from the data area of the recipient buffer to the data area of the originator buffer, wherein a message transmission is performed in a single transfer without a handshaking request signal and a handshaking grant signal and wherein said channel supports a plurality of concurrent message operations.

2. The high performance channels recited in claim 1 wherein each one of said plurality of originator buffers is paired with one and only one of said plurality of recipient buffers and each of said pairs of originator and recipient buffers supports a single message operation.

3. The high performance channels recited in claim 2 wherein said data areas and response areas of said plurality of originator buffers and the data areas and the request areas of said plurality of recipient buffers comprise physical buffers.

4. The high performance channels recited in claim 3 wherein said request areas of said plurality of originator buffers are virtual addresses in memory of said message originator element and said response areas of said plurality of recipient buffers are virtual addresses in memory of said message recipient element.

5. A data processing system having at least first and second elements interconnected by high performance channels for synchronously exchanging messages with low latency between said first and second elements, each of said high performance channels supporting at least one message and comprising:

an originator buffer in said first element and a dedicated recipient buffer in said second element, each of said originator buffer and said recipient buffer being composed of three logical areas designated as a request area, a response area and a data area, respectively, said first element containing a plurality of originator buffers and a plurality of recipient buffers and said second element containing a plurality of originator buffers and a plurality of recipient buffers each of said originator buffers and said recipient buffers being hardware communications buffers, said request area for storing request messages, said response area for storing response messages and said data area for storing data, each of said three logical areas being separate from one another;

first and second transmission paths of a high performance link connecting channels;

said first element managing both a connected originator buffer and a dedicated recipient buffer and transferring only a single request message over said first transmission path without requiring a correct request signal and a correct grant signal from said originator buffer and said recipient buffer, respectively, said single request message comprising a message request from the request area of said originator buffer to the request area of said recipient buffer and, selectively transferring message data from the data area of said originator buffer to the data area of said recipient buffer; and said second element responding by transferring only a single response message over said second transmission path, said single response message comprising a message response from said response area of said recipient buffer to said response area of said originator buffer and, selectively transferring message data from the data area of said recipient buffer to the data area of said originator buffer, wherein a message transmission is performed in a single transfer without a handshaking request signal and a handshaking grant signal and said channel supports a plurality of concurrent message operations.

6. The data processing system recited in claim 5 further comprising:

an originator buffer in said second element and a connected dedicated recipient buffer in said first element, said second element controlling both the originator buffer in said second element and said connected dedicated recipient buffer in said first element; and said high performance channels supporting true peer-to-peer communications between said first and second elements of said data processing system.

7. The data processing system recited in claim 5 wherein each one of said plurality of originator buffers is paired with one and only one of said plurality of recipient buffers; and each of said pairs of originator and recipient buffers supports a single message operation.

8. The data processing system recited in claim 7 wherein said first and second elements each comprise central processing complexes.

9. The data processing system recited in claim 7 wherein said first element comprises a central processing complex and said second element comprises an electronic element.

10. The data processing system recited in claim 9 wherein said electronic element comprises an electronic storage device which receives in the request area of said recipient buffer a read command in said request message and returns data from said electronic storage device to said data area of said originator buffer with said response message and receives in the request area of said recipient buffer a write command and in the data area of said recipient buffer data in a single request message and returns a response message to the response area of said originator buffer confirming that the data has been written to said electronic storage device.

11. The data processing system recited in claim 9 wherein said electronic element comprises a co-processor which receives data in the data area of said recipient buffer frown said central processing complex in a single request message and returns data to the data area of said originator buffer in a single response message.

12. The data processing system recited in claim 7 further comprising a plurality of elements interconnected by said high performance channels in a network forming said data processing system, each of said plurality of elements being connected to at least one other element with a high performance channel having an originator buffer and a connected dedicated recipient buffer.

13. The data processing system recited in claim 12 wherein said network comprises one of a local area network and a wide area network and said at least one of said plurality of elements comprises a server and others of said plurality of elements comprise workstations.

14. The data processing system recited in claim 12 wherein said network comprises a tightly coupled multiprocessor system and said at least one of said plurality of elements comprises an electronic storage device and others of said plurality of elements comprise central processing complexes, said electronic storage device receiving a read command in the request area of a recipient buffer in a request message from an originator central processing complex and returning data from said electronic storage device to the data area of an originator buffer in said originator central processing complex with a response message and receives a write command in the request area and data in the data area of a recipient buffer in a request message from an originator central processing complex and returns a response to the response area of an originating buffer in said originator central processing complex confirming that the data has been written to said electronic storage device, said electronic storage device issuing cross-invalidate messages from originator buffers in said electronic storage device to connected dedicated recipient buffers at other central processing complexes in said network, each of said other central processing complexes responding by issuing a response message from the response area of the connected dedicated recipient buffers to the response areas of the originator buffers in said electronic storage device.

15. The data processing system recited in claim 5 further comprising timing means in said first element for timing an expected period for response to a request message, said first element waiting for said response message from said second element after sending said request message.

16. The data processing system recited in claim 15 further comprising means responsive to a timeout signal from said timing means for recovering from an individual operation in a multiple operation environment.

17. In a data processing system including high performance channels for exchanging messages with low latency between elements of the data processing system, each of said high performance channels supporting multiple messages and comprising an originator buffer in a first element and a recipient buffer in a second element, each of said originator buffer and said recipient buffer being composed of three logical areas designated as a request area, a response area and a data area, respectively, said originator buffer and said recipient buffer being connected by a pair of transmission paths of a high performance link having a plurality of transmission paths, said first element controlling both a connected originator buffer and recipient buffer and transferring only one message, without requiring a correct request signal and a correct grant signal from said originator buffer and said recipient buffer, respectively, said message comprising a message request from the request area of said originator buffer to the request area of said recipient buffer and, said first element selectively transferring message data from the data area of said originator buffer to the dam area of said recipient buffer, and said second element responding by transferring only one message comprising a message response from said response area of said recipient buffer to said response area of said originator buffer and, selectively transferring message data from the data area of said recipient buffer to the data area of said originator buffer, a method for recovery of individual operations in a multiple operation environment comprising the steps of:

sending a request from said originator buffer to said recipient buffer and setting a timer for a first expected response time period;

processing all requests at said recipient buffer in an order in which received;

checking said timer and if said first expected response time period expires, sending a first cancel operation request from said originator buffer to said recipient buffer and setting said timer for a second expected response time period; and checking said timer and if a cancel request response is received from the recipient buffer by the originator buffer within said second expected response time period, terminating said request, the step of terminating said request having no effect on other messages processing operations being simultaneously in a same high performance channel.

18. In a data processing system including high performance channels for exchanging messages with low latency between elements of the data processing system, each of said high performance channels supporting multiple messages and comprising an originator buffer in a first element and a recipient buffer in a second element, each of said originator buffer and said recipient buffer being composed of three logical areas designated as a request area, a response area and a data area, respectively, said originator buffer and said recipient buffer being connected by a pair of transmission paths of a high performance link having a plurality of transmission paths, said first element controlling both a connected originator buffer and recipient buffer and transferring only one message comprising a message request from the request area of said originator buffer to the request area of said recipient buffer and, selectively transferring message data from the data area of said originator buffer to tile data area of said recipient buffer, and said second element responding by transferring only one message comprising a message response from said response area of said recipient buffer to said response area of said originator buffer and, selectively transferring message data from the data area of said recipient buffer to the data area of said originator buffer, a method for recovery of individual operations in a multiple operation environment comprising tile steps of:

sending a request from said originator buffer to said recipient buffer and setting a timer for a first expected response time period;

processing all requests at said recipient buffer in an order in which received;

checking said timer and if said first expected response time period expires, sending a first cancel operation request from said originator buffer to said recipient buffer and setting said timer for a second expected response time period; and checking said timer and if a cancel request response is received from the recipient buffer by the originator buffer within said second expected response time period, terminating said request, the method further including the step of establishing a system threshold for a number of cancel operation requests that may be transmitted for any original request message, wherein if said second expected response time period expires, said method further comprises the steps of:

sending additional cancel operation requests from said originator buffer to said recipient buffer and, for each said additional cancel operation request sent, setting said timer for an additional expected response time period;

counting cancel operation requests sent to generate a number and comparing said number with said threshold; and returning a status message from said high performance channel indicating a failure of the high performance channel if said number equals said threshold.

19. In a data processing system including high performance channels for exchanging messages with low latency between elements of the data processing system, each of said high performance channels supporting multiple messages and comprising an originator buffer in a first element and a recipient buffer in a second element, each of said originator buffer and said recipient buffer being composed of three logical areas designated as a request area, a response area and a data area, said originator buffer and said recipient buffer being connected by a pair of transmission paths of a high performance link having a plurality of transmission paths, said first element controlling both a connected originator buffer and recipient buffer and transferring only one message comprising a message request from the request area of said originator buffer to the request area of said recipient buffer and, selectively transferring message data from the data area of said originator buffer to the data area of said recipient buffer, and said second element responding by transferring only one message comprising a message response from said response area of said recipient buffer to said response area of said originator buffer and, selectively transferring message data from the data area of said recipient buffer to the data area of said originator buffer, a method for recovery of individual operations in a multiple operation environment comprising the steps of:

sending a request from said originator buffer to said recipient buffer and setting a timer for a first expected response time period;

processing all requests at said recipient buffer in an order in which received;

checking said timer and if said first expected response time period expires, sending a first cancel operation request from said originator buffer to said recipient buffer and setting said timer for a second expected response time period; and checking said timer and if a cancel request response is received from the recipient buffer by the originator buffer within said second expected response time period, terminating said request, wherein if said second expected response time period expires, said method further comprises the steps of:

sending a second cancel operation request from said originator buffer to said recipient buffer and setting said timer for said second expected response time period;

upon receiving a cancel request response after sending said second cancel operation request, sending a cancel complete request from said originator buffer to said recipient buffer; and responding to a cancel complete response from said recipient buffer to said originator buffer by terminating said request.

20. The method for recovery of individual operations in a multiple operation environment recited in claim 19 further comprising the steps of:

setting said timer for said second expected response time period when said cancel complete request is sent; and checking said timer and if a cancel complete response is not received from the recipient buffer by the originator buffer within said second expected response time period, sending a second cancel complete request from said originator buffer to said recipient buffer.

21. The method for recovery of individual operations in a multiple operation environment recited in claim 20 wherein if a cancel complete request is received, terminating said request message.

22. The method for recovery of individual operations in a multiple operation environment recited in claim 20 further comprising the steps of establishing a system threshold for a number of cancel complete requests which may be transmitted and setting said timer for said second expected response time period for each cancel complete request sent, wherein if said second expected response time period expires after sending a cancel complete request from said originator buffer to said recipient buffer, said method further comprises the steps of:

sending additional cancel complete requests from said originator buffer to said recipient buffer;

counting said cancel complete requests sent to generate a number and comparing said number with said threshold; and returning a status message from said high performance channel indicating a failure of the high performance channel if said number equals said threshold.

* * * * *